US005660749A

United States Patent [19]

Taguchi et al.

[11] Patent Number: 5,660,749

[45] Date of Patent: Aug. 26, 1997

[54] TRANSFORMER AND A.C. ARC WELDER

[75] Inventors: Toshio Taguchi; Teruo Okauchi; Tsuneaki Terashima, all of Kyoto, Japan

[73] Assignee: Yashima Electric Co., Ltd., Japan

[21] Appl. No.: 386,501

[22] Filed: Feb. 10, 1995

[30] Foreign Application Priority Data

| | | | |
|---|---|---|---|
| Feb. 14, 1994 | [JP] | Japan | 6-017543 |
| Aug. 12, 1994 | [JP] | Japan | 6-190221 |
| Aug. 18, 1994 | [JP] | Japan | 6-194019 |

[51] Int. Cl.[6] ..... B23K 9/10

[52] U.S. Cl. ..... 219/130.1; 336/60; 336/133

[58] Field of Search ..... 219/130.1, 136; 336/61, 60, 133, 134; 361/695

[56] References Cited

U.S. PATENT DOCUMENTS

| | | | |
|---|---|---|---|
| 2,133,919 | 10/1938 | Fries | 219/130.1 |
| 2,171,643 | 9/1939 | Brenkert | 361/695 |
| 2,230,945 | 2/1941 | Hansell | 336/133 |
| 2,840,789 | 6/1958 | Miller | 336/134 |
| 2,931,967 | 10/1960 | Mills | 219/130.1 |
| 2,992,405 | 7/1961 | Ursch | 336/61 |
| 3,059,164 | 10/1962 | Johnson | 219/130.1 |
| 3,195,084 | 7/1965 | Book | 336/61 |
| 3,541,487 | 11/1970 | Leonard | 336/61 |
| 3,551,863 | 12/1970 | Marton | 336/61 |
| 3,686,464 | 8/1972 | Hirst | 219/130.1 |
| 3,689,861 | 9/1972 | Gibson | 336/133 |
| 3,810,303 | 5/1974 | Hoell | 336/61 |
| 3,965,378 | 6/1976 | Liebe et al. | 336/61 |

*Primary Examiner*—Clifford C. Shaw

*Attorney, Agent, or Firm*—Beveridge, DeGrandi, Weilacher & Young, LLP

[57] ABSTRACT

A transformer includes a stator core, primary coils, secondary coils, and heat radiating plates each of which projects outward from between interior layers of the primary coil and/or secondary coil. An A.C. arc welder includes the transformer therein, with a movable core which can move to and fro between the primary coils and secondary coils and which has different widths in the movable direction. An A.C. arc welder also includes openings for taking in air at a front portion of a case cover and a fan for exhausting air at a rear portion of the case cover.

17 Claims, 16 Drawing Sheets

Fig. 9(a)
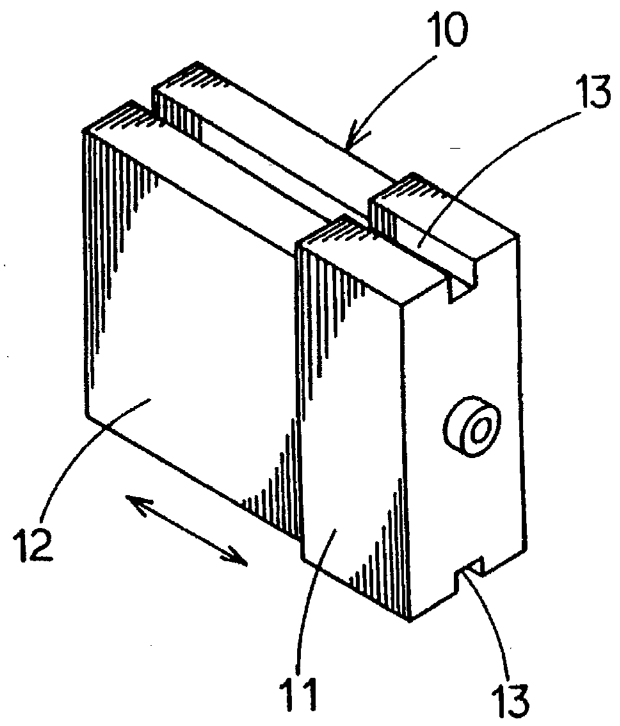
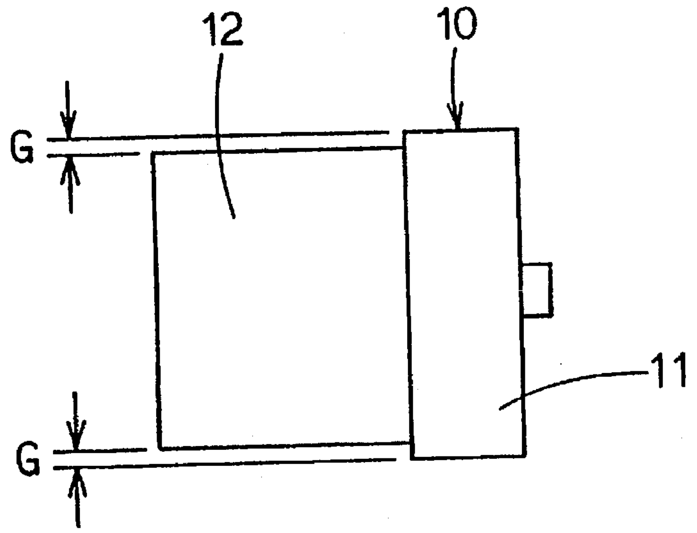
Fig. 9(b)

Fig. 12(a)
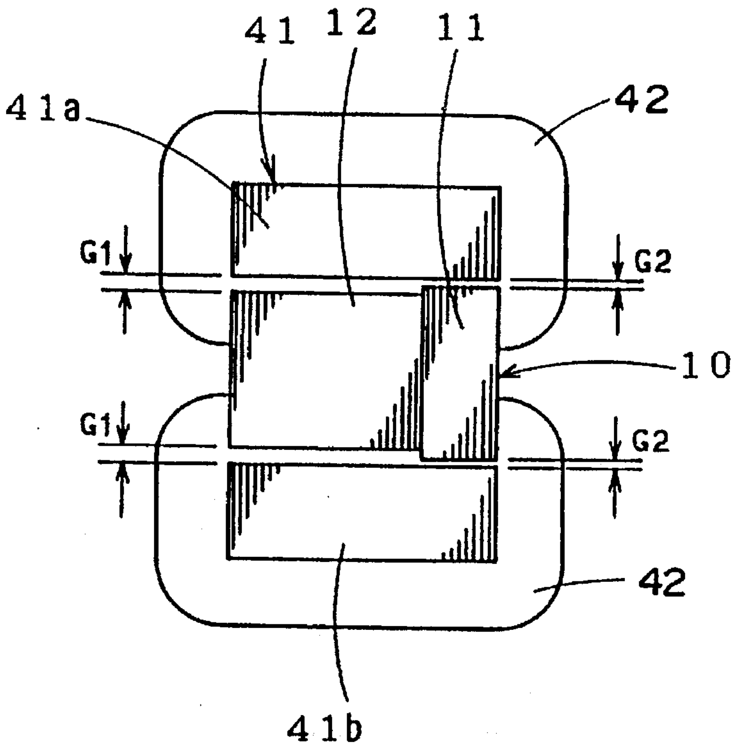
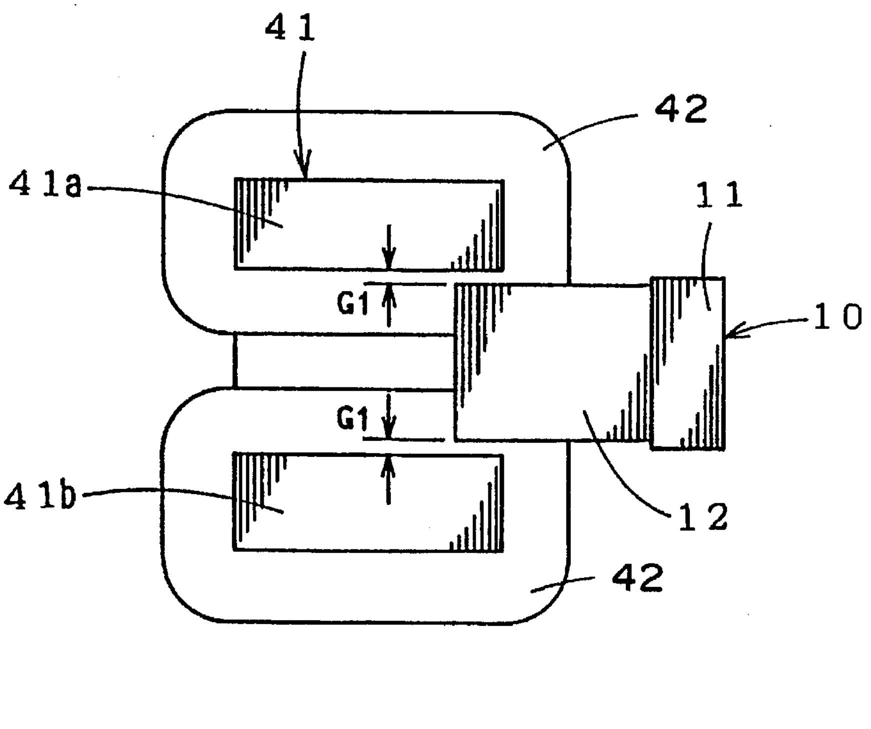
Fig. 12(b)

Fig. 20(a)
PRIOR ART
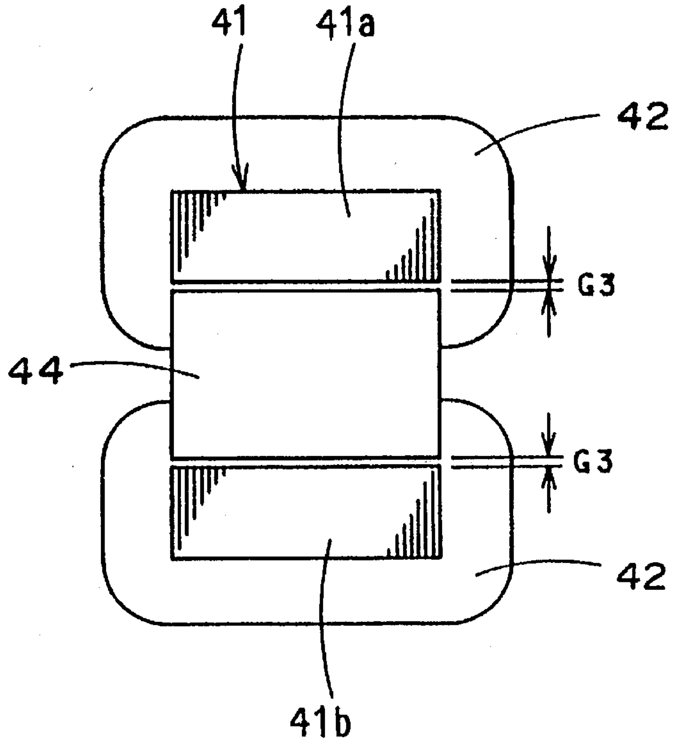
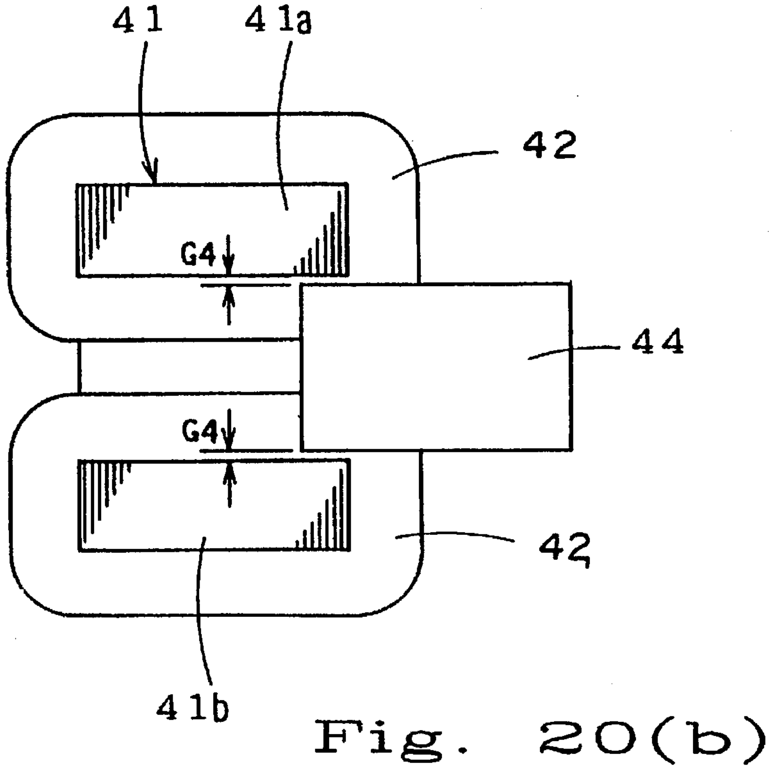
Fig. 20(b)
PRIOR ART

Fig. 21(a)
PRIOR ART
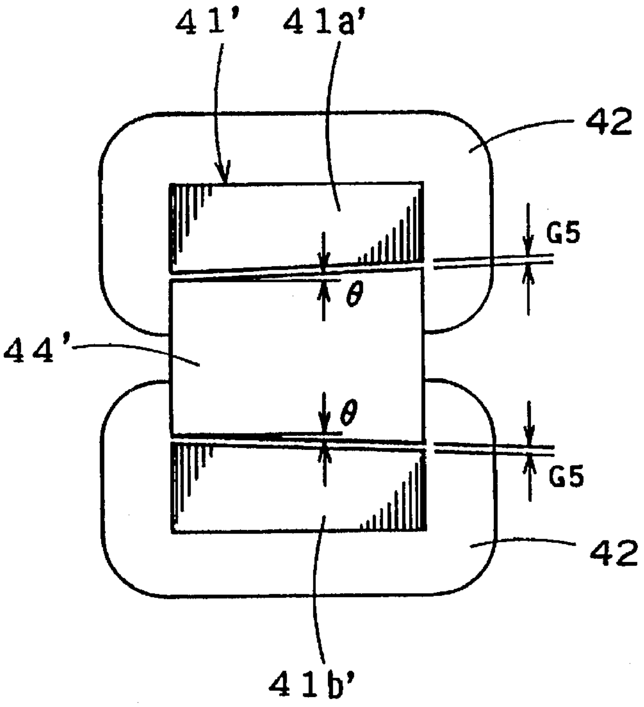
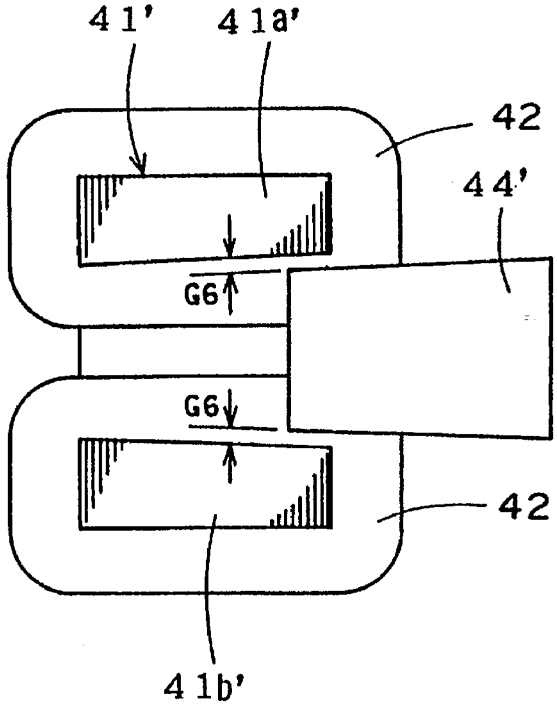
Fig. 21(b)
PRIOR ART

TRANSFORMER AND A.C. ARC WELDER

BACKGROUND OF THE INVENTION

The present invention relates to a transformer which is used in an A.C. arc welder and the like, and which requires a large current, and to an A.C. arc welder which requires a large current.

RELATED ART

Generally in a transformer which deals with a large current, Joule heating of $I^2R$ is generated by a current I flowing in the transformer and a conductor resistance R. The temperature of the transformer rises following the generation of Joule heating so that the temperatures of insulating elements of the transformer become harmfully high. Therefore, a measure such as forced air cooling, cooling by circulation oil or the like is taken to meet the situation.

In an A.C. arc welder which employs a transformer, it is demanded that the A.C. arc welder be small-sized for lowering the cost of material, obtaining disposition space, improving carryability and the like. When the transformer is made small-sized to meet the demand, a diameter of a winding of a coil is made small, or a width or thickness of the transformer is made small. When the diameter of the winding is made small and a predetermined current flows in the winding, heat generation becomes great due to the increase of winding resistance. Therefore, the cooling ability must be improved and therefore small-sizing of the A.C. arc welder is difficult to realize.

Generally, a transformer disposed in an A.C. arc welder has the arrangement illustrated in FIG. 19. The transformer includes a stator core 41 which has a rectangular opening in its center portion, and a pair of primary coils 42 and secondary coils 43 which are wound at an upper leg 41*a* and a lower leg 41*b* of the stator core 41, in an insulated condition from the stator core 41. The transformer also includes a movable core 44 which can move into and out from a window (between one of the primary coils 42, one of the secondary coils 43, the other primary coil 42, and the other secondary coil 43) which is a space portion of the stator core 41. The movable core 44 moves by being guided by two guide rail mechanisms 46 and by rotation of a screw shaft 45 with a handle (not illustrated) which shaft 45 is engaged with the movable core by a screw mechanism. By moving the movable core 44 along the guide rail mechanisms 46 to and fro, a gap between the stator core 41 and the movable core 44 is varied so that an output current from the secondary coils 43 are adjusted.

When the movable core 44 is moved to the innermost position, as is illustrated in FIG. 20(*a*), that is, when the movable core 44 is positioned in the window of the stator core 41 and the inner edge face and the outer edge face of the stator core 41 are matched to the inner edge face of the movable core 44 and the outer edge face of the movable core 44, respectively, a magnetic circuit consisting of the stator core 41 and the movable core 44 for circulating magnetic flux in the upper and lower primary coils 42 is constructed. Therefore, interlinkage of magnetic flux with the secondary coils 43 decreases and the output current from the secondary coils 43 decreases.

On the contrary, when the movable core 44 is moved to the outermost position, as is illustrated in FIG. 20(*b*), the magnetic circuit consisting of the stator core 41 and the movable core 44 raises in magnetic resistance. Therefore, almost none of the magnetic flux generated by the primary coils 42 flows into the movable core 44 but is instead interlinked with the secondary coils 43 so that the output current from the secondary coils 43 increases.

In such a transformer, it is determined that the size between the upper outer edge and the lower outer edge of the movable core 44 is smaller than the size between the upper edge of the window and the lower edge of the window of the stator core 41, and gaps between the upper leg 41*a* and lower leg 41*b* of the stator core 41 and the upper face and lower side face of the movable core 44 are proper, so that the movable core 44 is smoothly moved to and fro even when the movable core 44 is in a strong magnetic field. The gaps strongly influence the characteristics of the A.C. arc welder, and therefore it is important how the size of the gaps are determined.

When the movable core 44 is positioned at a position (the innermost position) which minimizes the secondary output current {refer to FIG. 20(*a*)}, gaps G3 are decreased as much as possible so the magnetic resistance of the circulating magnetic circuit enveloping the primary coils 42 is increased to the maximum value, and the secondary output current is ajusted to be the minimum value.

On the contrary, when the movable core 44 is positioned at a position (the outermost position) which maximizes the secondary output current {refer to FIG. 20(*b*)}, gaps G4 are increased as much as possible so the magnetic resistance of the circulating magnetic circuit enveloping the primary coils 42 is decreased to the minimum value, and the secondary output current is ajusted to be the maximum value.

But, in the transformer having the arrangement illustrated in FIGS. 20(*a*) and 20(*b*), the gap G3 equals the gap G4 due to the shape of the upper leg 41*a*, lower leg 41*b* of the stator core 41 and the movable core 44, so that it is impossible to vary the gaps properly depending upon the position of the movable core 44.

As is apparent from the foregoing, demanded values for the gaps ate reciprocal depending upon the position of the movable core 44.

To solve the problem, a design was made where the movable core 44 is not a rectangular shape but a trapezoid shape having faces inclined by an angle of θ, such that opposing faces of the upper leg 41*a* and lower leg 41*b* of the stator core 41 are tapered by an angle of θ correspondingly, as is illustrated in FIGS. 21(*a*) and 21(*b*). In this case, when the movable core 44' is moved to the innermost position, gaps G5 are formed between the upper leg 41*a*' and lower leg 41*b*' of the stator core 41' and the upper face and lower face of the movable core 44'. On the contrary, when the movable core 44' is moved to the outermost position, gaps G6 are formed between the upper leg 41*a*' and lower leg 41*b*' of the stator core 41' and the upper face and lower face of the movable core 44'. The gaps G5 are smaller than the gaps G6, and the gaps greatly vary depending upon the position of the movable core 44', therefore the reciprocal demands are satisfied.

The cost of a movable core which is made by punching using a pressing die scarcely differs whether the movable core is a rectangular shape or a trapezoidal shape having little difference in yield of material. But the stator core is made by laminating electromagnetic steel plates, each of which is made by punching using the same die for all of the plates. Thus, when the face of the window of the stator core is tapered, cutting processing is thus required after laminating so that a very large number of processings are required and the cost of the stator core greatly increases. Therefore, the cost of an A.C. arc welder is increased and disadvantages in the processing accuracy rises.

An A.C. arc welder has been developed to minimize its size and its weight. When the electric capacity of an A.C. arc welder is kept constant, minimizing its transformer and its outer case cover in size causes a great increase in an inner temperature due to heat generation. Therefore, it is becoming in general that a fan for taking in or exhausting is provided at a proper position of the outer case cover so as to intake outer air for forcibly cooling the transformer, to prevent the transformer temperature from rising temperature to a harmfully high level.

When the A.C. arc welder minimized in size and in weight is developed, though the heat generation by the transformer does not vary, the temperature within the outer case cover tends to rise further due to minimizing of the case cover in size. To cool within the case cover, a stronger (in other words, a larger) fan for taking in or exhausting is necessary. The fan counteracts the minimizing in size, and causes great increase in the cost of component parts, and increase in noise level due to increase in sound generated by air flow. It is a cause of the increase in noise that the transformer having various concave portions and projecting portions is almost fully disposed within the minimized case cover, and air flow for forcible cooling is interferred with by various obstacles and the air flows in whirls complicatedly. Therefore, the air does not flow smoothly within the case cover comparative to the increase in the rated air flow value of the provided air cooling fan, and, consequently, the cooling effect of the transformer is not improved to the expected degree.

SUMMARY OF THE INVENTION

It is an object of the present invention to minimize a transformer in size while heat generation thereof is suppressed.

It is another object of the present invention to vary a gap size corresponding to a position of a movable core while construction is made simple and cost is made low.

It is a further object of the present invention to minimize an A.C. arc welder in size and to provide high cooling ability of a transformer which is housed in the A.C. arc welder.

A transformer according to the present invention in which a coil is wound around a core, comprises a heat radiating plate which is provided between layers of coils and which projects outside of the coils.

When the transformer is employed, though the heat radiating plate is projected from the inner space between layers of coils, the heat of the coils is efficiently radiated by providing the heat radiating plate between the layers which become the most high in temperature and by employing forced cooling. Therefore, rising temperature is suppressed using a comparatively small fan even when the thickness and the width of the windings of the coils are made small.

Another transformer according to the present invention in which coils are wound around a core, comprises a heat radiating plate which is provided between layers of coils and which projects towards the outside of the coils, and wherein a portion of the heat radiating plate existing in the coils and/or a portion of the heat radiating plate projecting from the coils and the coils are fillet welded.

When the transformer is employed, the heat radiating plate is securely fixed between the layers of the coils so that positional shifting of the heat radiating plate due to outer force such as vibration, impact and the like are prevented from occurring. Also, the heat of the coils is efficiently conducted to the heat radiating plate especially through the welded sections so that heat radiating ability is improved.

An A.C. arc welder according to the present invention includes a transformer which has a stator core, primary coils and secondary coils wound around the stator core in an opposing condition, and a movable core disposed between one of the primary coils, one of the secondary coils, the other primary coil, and the other secondary coil in a movable to and fro manner. The welder is characterized in that the movable core has different width depending upon positions in a movable direction, the width being a size in a direction which is vertical to the movable direction.

When the A.C. arc welder is employed, a gap between the stator core and the movable core can be varied in correspondence to the position of the movable core. And, the stator core and the movable core are simple in their constructions and are low in their costs because a cutting process is unnecessary.

Another A.C. arc welder according to the present invention includes a case cover, a transformer disposed within the case cover, and a fan for exhausting air provided at a rear plate of the case cover. The welder comprises openings for taking in outer air, which openings are provided at front side portions of both side plates and a bottom plate of the case cover.

When the A.C. arc welder is employed, outer air taken in from the openings flows regularly from the front portion of the case cover to the rear portion of the case cover at which rear portion the fan for exhausting air exists, so that the outer faces of the coils which generate great heat efficiently exchange heat with the flowing air.

Hereinafter, the reason is described for providing the openings for taking in outer air at the front portion of the both side plates and bottom plate of the case cover. In general, heat generation of a transformer of an A.C. arc welder is divided into two parts. One part of the heat generation is caused by iron losses of the cores which constitute a magnetic circuit, and the other part of the heat generation is caused by copper losses of the coils in which large currents flow. The heat generation caused by copper losses of the coils is comparatively greater than the heat generation caused by iron losses of the cores. It is indispensable that the air flow within the case cover is guided and regulated so as to guide the taken in cool and fresh air efficiently and concentratedly to the outer face of the coils for improving the forcible air cooling effect of the coils.

Therefore, the cool and fresh air taken in from the front portion of the case cover regularly flows from the front portion to the rear portion and towards the fan for exhausting air within the case cover. The case cover has a duct shape in its entirety so that heat exchange between the flowing air and the outer faces of the coils is efficiently performed, thereby forcible air cooling of the coils is improved by multiplication effects of the positions of the openings for taking in air and the fan for exhausting air which is provided at the rear portion of the case cover. The multiplication effects are obtained by omitting ventilators (louver windows) which are opened in the entire region of both side plates of a case cover and entirely closing or entirely opening of a bottom plate the case cover of a conventional arc welder, and providing openings for taking in air at the front portion of both side plates of the case cover and at the front portion of the bottom plate of the case cover. It is of course possible that a mesh Guard member for preventing substances such as dust, small pieces of iron and the like, from catching into the cover, which mesh guard member is provided at the opening for taking in outer air, is provided at the front side portion of the bottom plate of the case cover.

BRIEF DESCRIPTION OF THE DRAWINGS

FIG. 9(*a*) is a perspective view illustrating a movable core of a transformer which is used in an A.C. arc welder;

FIG. 9(*b*) is a left side view illustrating the movable core of the transformer which is used in the A.C. arc welder;

FIGS. 12(*a*) and 12(*b*) are cross sectional views of a main portion of a transformer useful in understanding a function of the transformer in the A.C. arc welder;

FIGS. 20(*a*) and 20(*b*) are cross sectional views of a main portion of a transformer useful in understanding a function of the transformer in the conventional A.C. arc welder; and FIGS. 21(*a*) and 21(*b*) are cross sectional views of a main portion of a transformer useful in understanding a function of the transformer in another conventional A.C. arc welder.

DETAILED DESCRIPTION OF THE PREFERRED EMBODIMENTS

Figure 1:
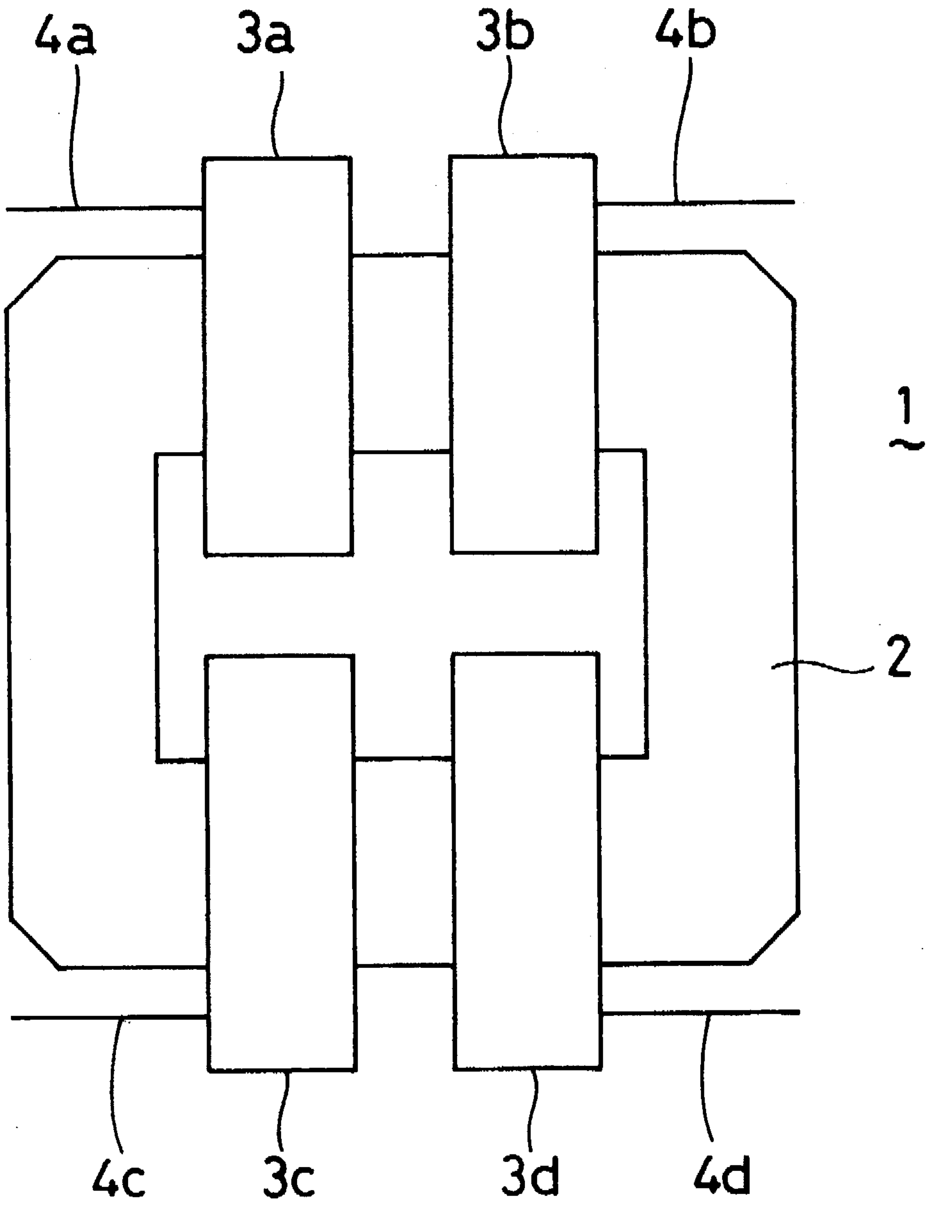
FIG. 1 is a front view of a transformer.

FIG. 1 is a front view of a transformer which is used for an A.C. arc welder according to the present invention.

The transformer 1 includes a core 2 which has a rectangular outer shape and a rectangular opening, and four coils 3*a*, 3*b*, 3*c* and 3*d* which are wound to the core 2. The transformer 1 also includes heat radiating and cooling fins (heat radiating plates) 4*a*, 4*b*, 4*c* and 4*d*. Each fin is provided at a position which corresponds to about a half of the entire winding layers of each coil, that is, at an intermediate position between the winding starting layer and the winding ending layer. Each fin is provided in a projecting manner from each coil. In this embodiment and though the coils 3*a* and 3*b*, the coils 3*c* and 3*d* are provided adjacent to one another, respectively, the heat radiating plates 4*a* and 4*c* project leftward in FIG. 1, while the heat radiating plates 4*b* and 4*d* project rightward in FIG. 1. When the coils 3*a* and 3*b* and the coils 3*c* and 3*d* are not adjacent to one another, respectively, the heat radiating plates 4*a* and 4*b* and the heat radiating plates 4*c* and 4*d* may project in directions which direct their projecting portions toward one another. However, there still should be sufficient insulating spaces between the leading edges of the heat radiating plates 4*a* and 4*b*, and the heat radiating plates 4*c* and 4*d*.

The reason for determining the clipping position of each heat radiating plate between layers of each coil to be the intermediate position (central layer position) between the winding starting layer and the winding ending layer is that the outer face portion of each coil easily radiates its heat by air cooling, and the portion near to the core 2 easily radiates its heat through the core 2, but the intermediate portion of each coil has difficultly radiating its heat. With the invention, then, the heat of the intermediate portion of each coil is radiated through the heat radiating plate.

Figure 2:
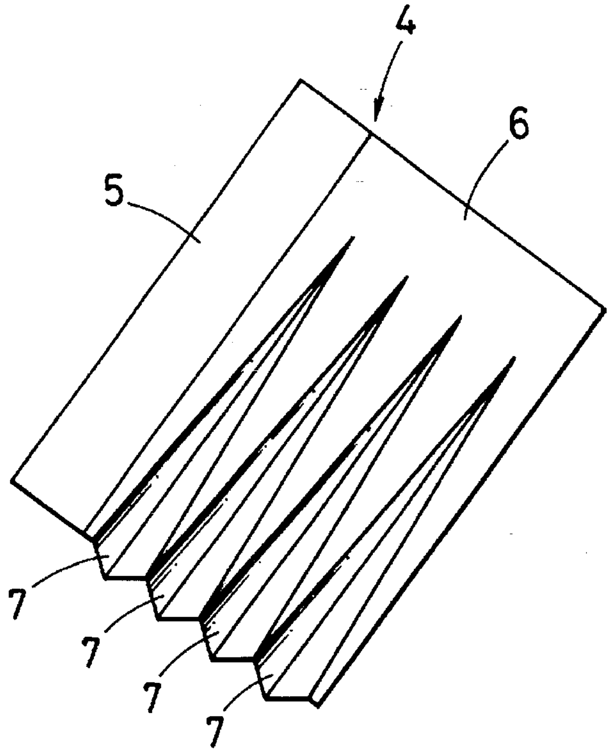
FIG. 2 is a perspective view of a heat radiating plate which is to be incorporated in the transformer.

FIG. 2 illustrates a specific shape of the heat radiating plate 4 (4*a*, 4*b*, 4*c*, 4*d*).

The heat radiating plate 4 includes a first flat section 5 which is clipped between winding layers, a second flat section 6 which is formed at one edge portion in a direction which is vertical to a winding direction of each coil 3, and plural V-shaped grooves 7 which have increasing depths from the second flat section 6 to the other edge portion. The heat radiating plate 4 is formed by applying pressing processing to an aluminium plate or the like.

The reason for forming V-shaped grooves 7 in the heat radiating plate 4 is that the heat radiating area should be increased to twice or three times compared to that of a flat plate. Also, the reason for providing the second flat section 6 instead of forming the entire heat radiating face with V-shaped grooves is to provide strength for the heat radiating plate 4 in a direction which is vertical to the winding direction of the coil.

Figure 3:
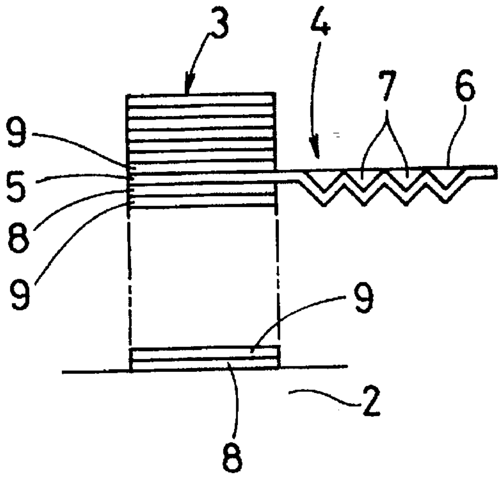
FIG. 3 is a cross sectional view illustrating an incorporated condition of the heat radiating plate.

When the heat radiating plate 4 is clipped between the winding layers of the coil 3, an insulating sheet (paper tape) 8 is wound to the core 2, then the winding 9 is wound. After that, the insulating sheet 8 is wound to the wound winding layer, then the winding 9 is wound. Thereafter, winding of the insulating sheet 8 and the winding of the winding 9 are alternately repeated, as is illustrated in FIG. 3. When the thickness of the wound insulating sheet 8 and the wound winding 9 becomes half of the total thickness of the coil 3, the first flat section 5 of the heat radiating plate 4 is put on the uppermost insulating sheet 8, then the winding 9 is wound so that the first flat section 5 is clipped therebetween. Thereafter, winding of the insulating sheet 8 and the winding of the winding 9 are alternately repeated, as is illustrated in FIG. 3. Flat rectangular wire made of aluminium, copper or the like may be used as the winding 9.

Figure 4:
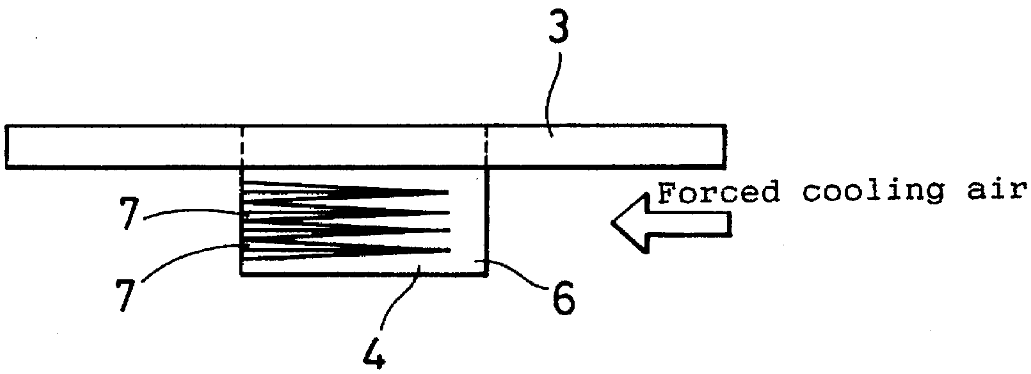
FIG. 4 is a plan view of a main portion of the transformer.
Figure 5:
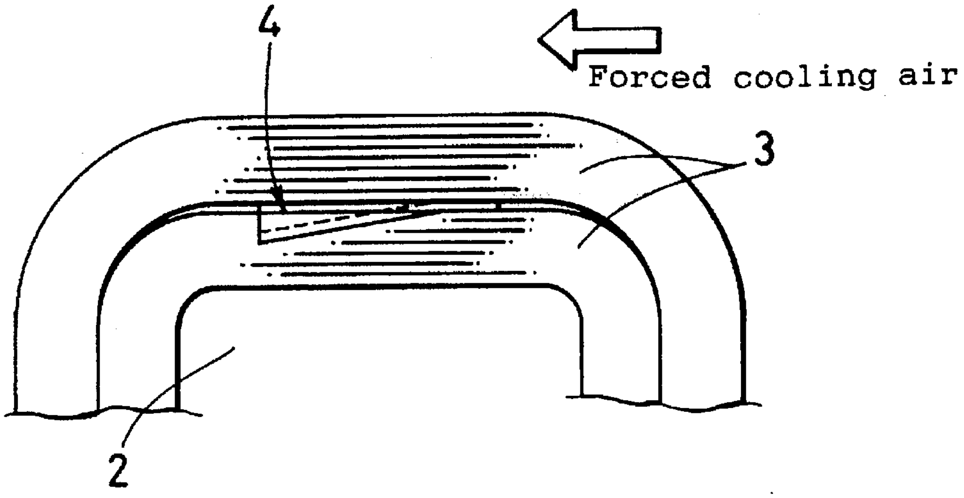
FIG. 5 is a side view of a main portion of the transformer.

FIG. 4 illustrates a plan view of only one coil section of the transformer which has been made in the above manner and has the heat radiating plate, while FIG. 5 illustrates a side view thereof.

In the transformer, air is blown by a fan (not illustrated) in a direction illustrated by an arrow so that the transformer is forcibly air cooled.

Therefore, sufficient cooling is realized using a comparatively small fan so that the apparatus in its entirety is minimized in size and so that cost for material is reduced.

In the above embodiment, description was made of a case where four coils are wound to the core, but the number of coils may be varied depending upon the necessity. Further, the heat radiating plate is provided at the central layer position of the coil in the above embodiment. However, the heat radiating plate may be clipped at a layer position which is the most raised in temperature. Furthermore, U-shaped grooves, rectangular grooves or the like may be employed instead of the V-shaped grooves. Further, V-shaped grooves may be omitted. The transformer according to the present invention is effective in application to an A.C. arc welder, but the transformer is applicable to various apparatus which cause a temperature rise in the transformer. It is preferable that the heat radiating plate is made of copper or aluminium.

SECOND EMBODIMENT

Figure 6:
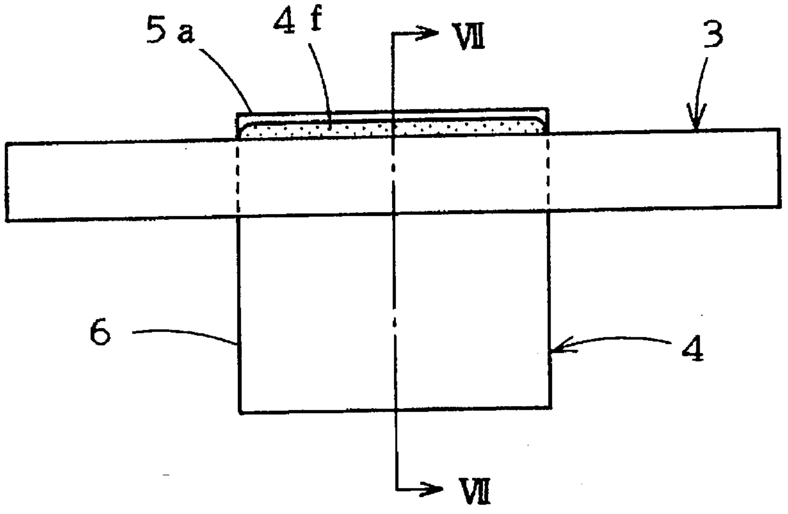
FIG. 6 is a plan view of a main portion of a transformer.
Figure 7:
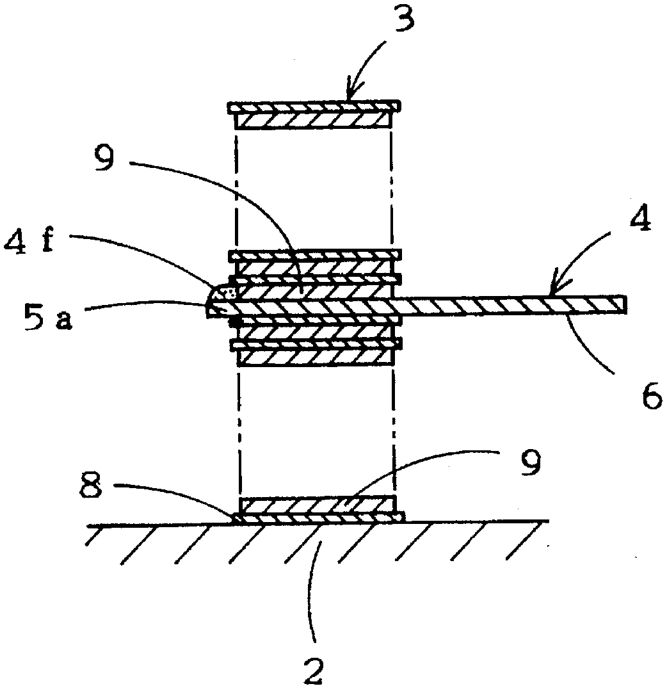
FIG. 7 is a cross sectional view illustrating a main portion taken along line VII—VII of the transformer in FIG. 6.

FIG. 6 illustrates a plan view of a main portion of a transformer according to a second embodiment, while FIG. 7 illustrates a cross sectional view of a main portion taken along a line VII—VII in FIG. 6.

This embodiment differs from the above embodiment in that the V-shaped grooves 7 are omitted, the first flat section 5 projects (the projected portion is indicated with 5*a*) slightly from the coil 3 in a direction reverse to the projecting direction of the second flat section 6, and in that the flat rectangular wire 9 and the projected portion 5*a* are fillet welded at 4*f* by, for example, tungsten inert gas welding (hereinafter referred to as TIG welding) so that the projected portion 5*a* and the flat rectangular wire 9 are welded into one body. The fine fillet welding 4*f* is easily performed by the TIG welding.

Forced air cooling, circulating oil cooling or the like, is applied to the transformer so that heat generated in the coil 3 is effectively conducted to the heat radiating plate 4 through the fillet wedled portion 4*f*, and then is radiated to the cooling medium (forced air flow, circulating oil or the like) so that the ability for radiating heat is improved because the heat radiating plate 4 is fillet welded 4*f* to a layer of the coil 3. Further, positional shifting and slipping of the heat radiating plate 4 are prevented from occurring.

Figure 8:
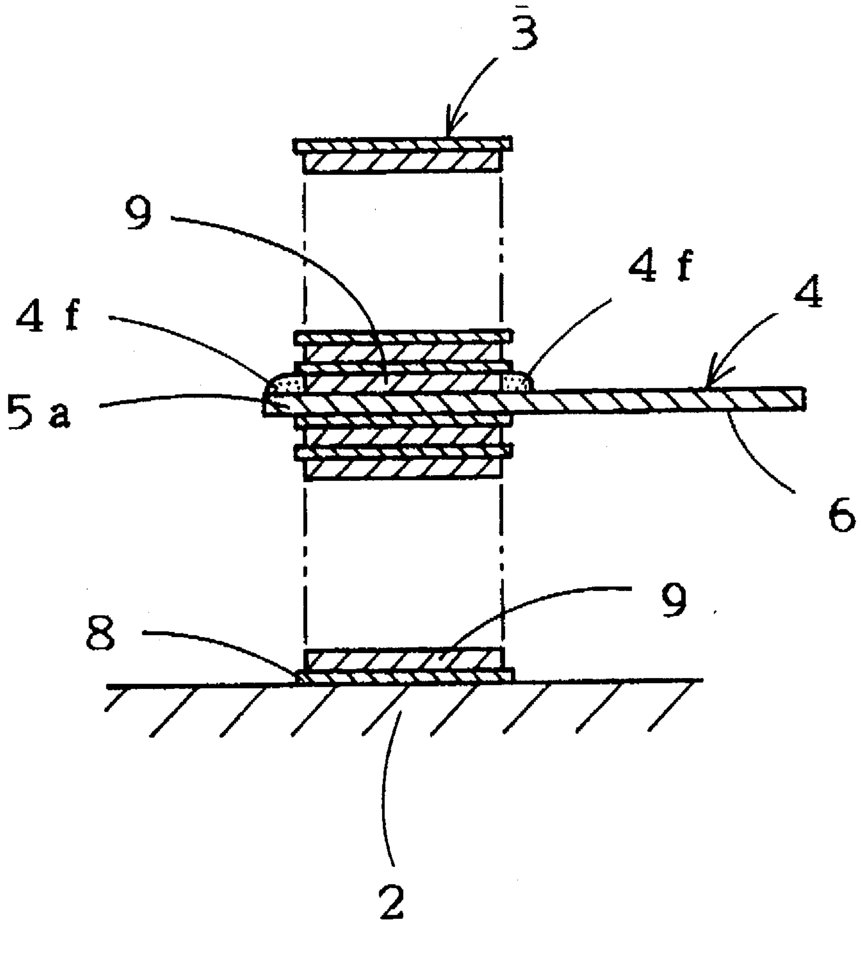
FIG. 8 is a cross sectional view illustrating a main portion of a transformer.
Figure 10:
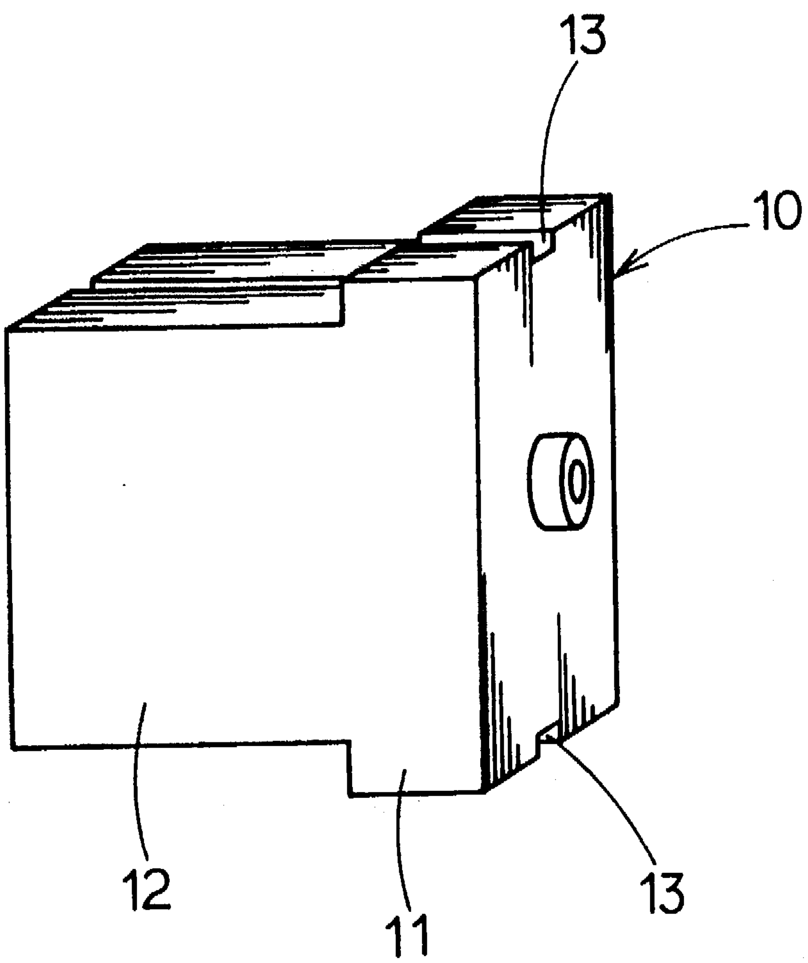
FIG. 10 is a perspective view of another movable core.

FIG. 8 illustrates a cross sectional view of a main portion of a modified transformer.

The transformer is different from the transformer illustrated in FIGS. 6 and 7 in that a portion of the heat radiating plate 4 which is opposite to the projecting portion 5*a* and which is adjacent to the coil 3 is also fillet welded at 4*f* by, for example, TIG welding. The transformer is further improved in heat conductivity and is further improved in stability of the heat radiating plate 4 because the heat radiating plate 4 is fillet welded at 4*f* to both sides of the coil 3.

Alteratively, the fillet welded portion 4*f* may be limited to that fillet welded portion 4*f* which was added in FIG. 8. The fillet welded portion 4*f* may be located on the core side of the heat radiating plate 4. Silicon grease and the like having a high heat conductivity may be painted on the contacting faces of the heat radiating plate 4 and the winding layer of the coil 3 so as to improve the heat conducting effect between the winding layer and the heat radiating plate 4.

Further, heat resistance between the coil 3 and the heat radiating plate 4 is prevented from varying and the heat radiating and cooling effect is prevented from lowering due to the expansion and contraction and the like which are generated by heating and cooling cycles of the heat radiating plate 4, because the heat radiating plate 4 is securely fixed and contacted to the coil by fillet welding 4*f*. Therefore, usage of the transformer for a long period is realized without diadvantages.

THIRD EMBODIMENT

An A.C. arc welder according to a third embodiment of the present invention has a characteristic point in a movable core, so description will now be made mainly to the movable core.

FIGS. 9(*a*) and 10 illustrate a perspective view of the movable core, while FIG. 9(*b*) illustrates a left side view thereof.

The movable core 10 has a front block 11 and a rear block 12 which are made by laminating together electromagnetic steel plates having different sizes from one another in a moving so and fro direction (a longitudinal direction, that is the direction illustrated in FIG. 9(*a*) by arrows), respectively. The front block 11 has a larger width (height) than that of the rear block 12 in a direction (a vertical direction) which is vertical to the moving to and fro direction. Therefore, the movable core 10 has two heights in its entirety which are different from one another. Thus, gaps G exist between the sides of both blocks 11 and 12 according to the sizes of she both blocks 11 and 12. Further, the movable core 10 includes grooves 13 in the upper face and the bottom face thereof for receiving a guide rail mechanism 46 (refer to FIG. 11) for guiding the movable core 10 to move to and fro. The movable core 10 does not require a cutting process so that the movable core is reduced in cost.

The movable core 10 may comprise three or more blocks where the blocks have different heights from one another by stages, instead of comprising two blocks. Further, a magnetic circuit characteristic of a transformer in its entirety can be varied regardless of a position of the movable core in the longitudinal direction, by employing electromagnetic steel plates for one block formed of material which is different in magnetic characteristic from that of another block. Furthermore, the movable core 10 may be made by laminating electromagnetic steel plates, which plates are punched and pressed into a T-shape, in a direction which is the same as that of an ordinary movable core instead of laminating electromagnetic steel plates in the longitudinal direction of the movable core 10.

Figure 11:
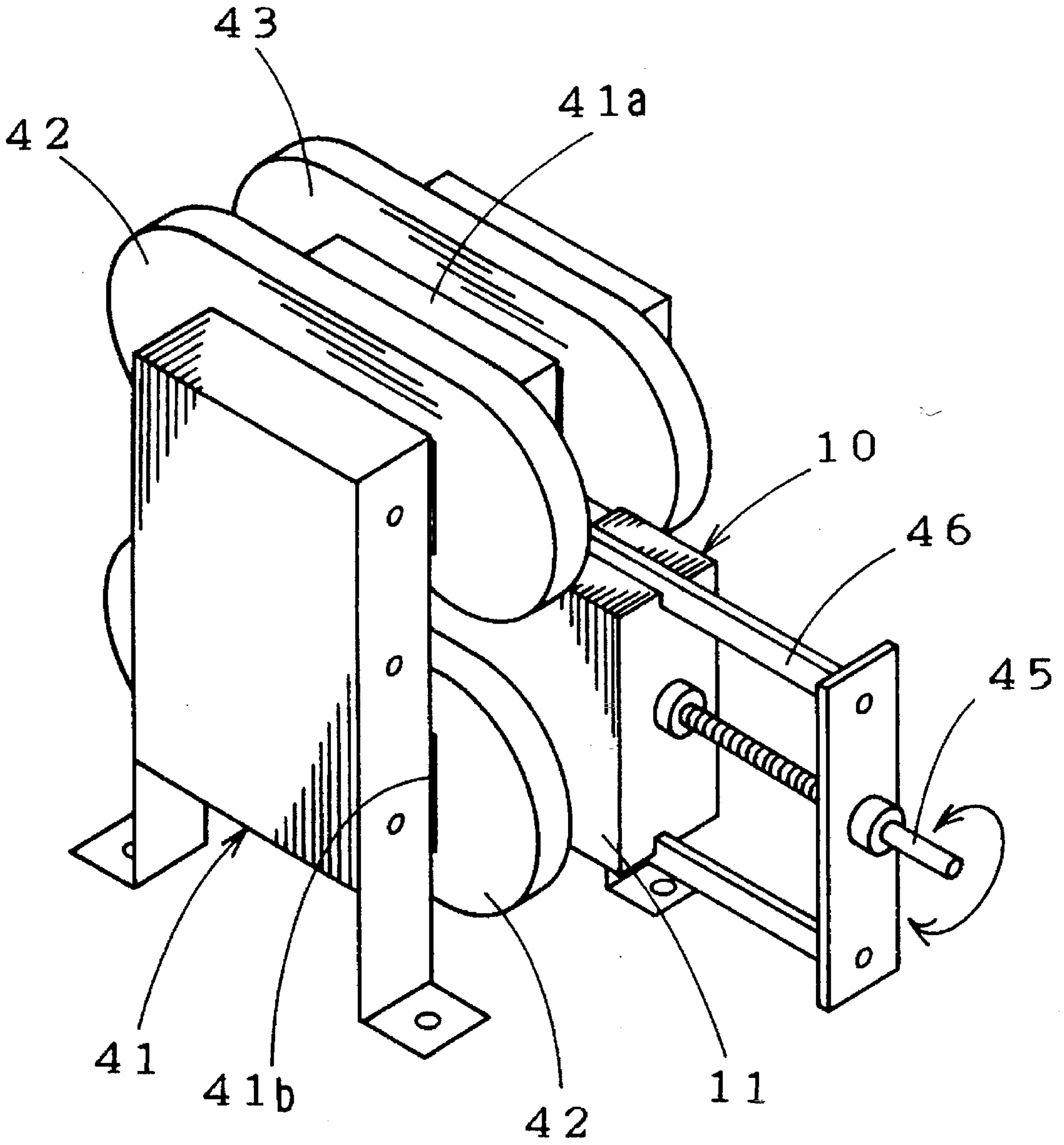
FIG. 11 is an outer perspective view of an A.C. arc welder which incorporates the movable core therein.

FIG. 11 illustrates an example of a transformer which employs the movable core 10 having the above arrangement.

Figure 19:
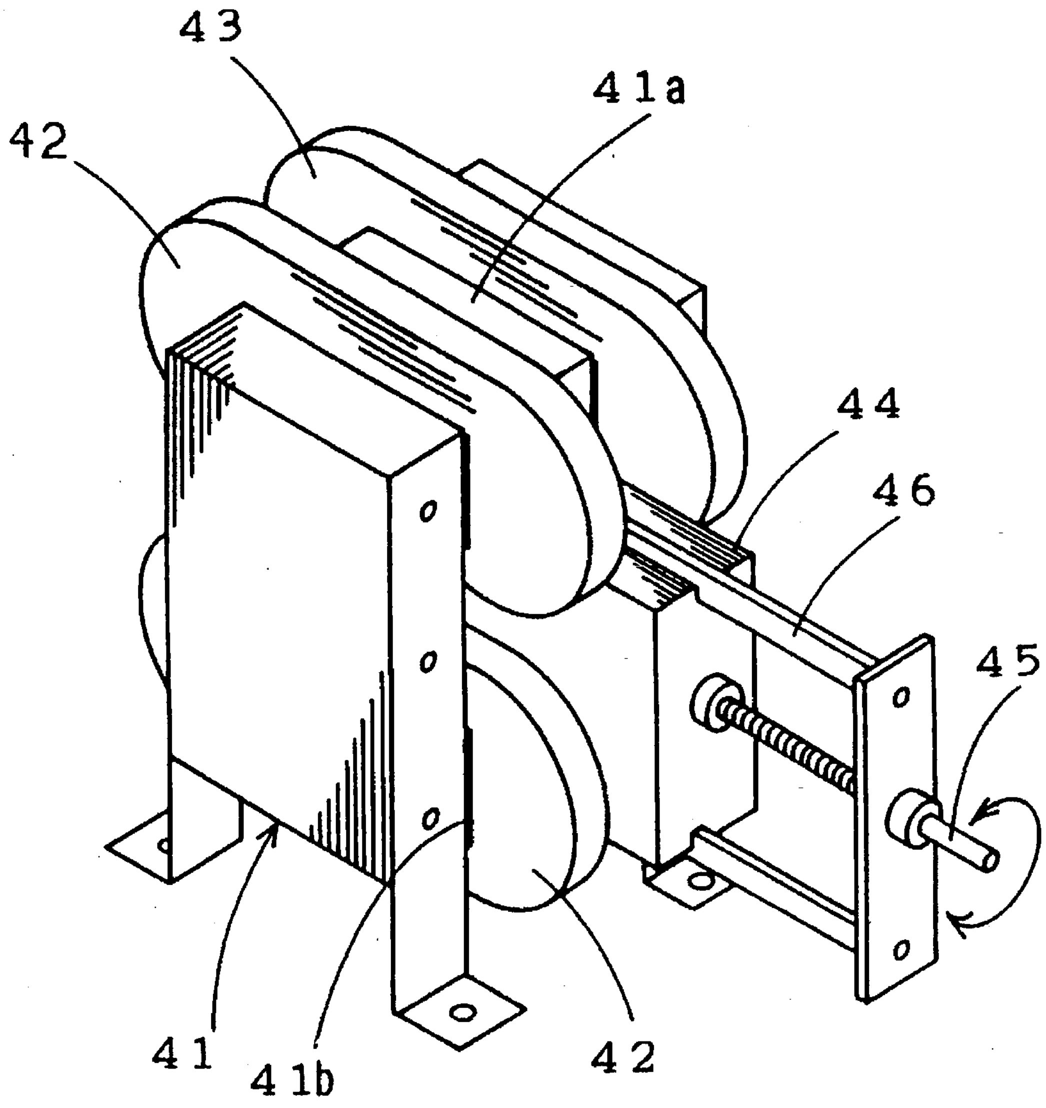
Fig. 19 PRIOR ART
FIG. 19 is an outer perspective view of a conventional A.C. arc welder.

The transformer has the same arrangement excepting the movable core 10 as the transformer illustrated in FIG. 19. The same reference is therefore applied to the same component and a detailed description of its operation is omitted.

The function of the transformer is described referring to FIGS. 12(*a*) and 12(*b*). When the movable core 10 is moved to the innermost position {refer to FIG. 12(*a*)} by rotating a screw shaft 45 using a handle (not illustrated), gaps G1 are formed between an upper leg 41*a*, and lower leg 41*b* of a stator core 41 and the upper face, and bottom face of the rear block 12 of the movable core 10, and Gaps G2 are formed between the upper leg 41*a* and lower leg 41*b* of the stator core 41 and the upper face and bottom face of the front block 11 of the movable core 10. The gap G1 is greater than the gap G2 due to the sizes of the front block 11 and the rear block 12.

In this condition, there are two species of gaps G1 and G2 which are different in size from one another. But, magnetic flux circulating within the stator core 41 inevitably mostly flows into a region G2 having smaller magnetic resistance (smaller gaps) and scarcely flows into a region G1 having greater magnetic resistance (greater gaps). Therefore, it is essentially equivalent to a case where only the smaller gaps G2 exist, and the transformer shows a magnetic characteristic which is similar to a magnetic characteristic of a transformer which has small gaps.

On the contrary, when the movable core 10 is moved to the outermost position {refer to FIG. 12(*b*)}, the front block 11 corresponding to small gaps G2 of the movable core 10 moves away sufficiently from the stator core 41 in which magnetic flux flows so that the front block 11 scarcely influences the magnetic resistance of the magnetic circuit. Therefore, it is essentially equivalent to a case where only the greater gaps G1 exist, and the transformer shows a magnetic characteristic which is similar to a magnetic characteristic of a transformer which has great gaps.

The transformer can vary the size of the gaps to an adequate size by varying the position of the movable core 10 so that a secondary output current from secondary coils 43 of the transformer is adjusted to an adequate current. Further, the adjusting function of the secondary current depending upon the variation of the gap can be improved by employing electromagnetic steel plates having smaller magnetic resistance (higher permeability) as the electromagnetic steel plates which constitute the front block 11 of the movable core 10 and by employing electromagnetic steel plates having greater magnetic resistance (lower permeability) as the electromagnetic steel plates which constitute the rear block 12 of the movable core 10.

Furthermore, the movable core 10 is made by laminating the electromagnetic steel plates in the longitudinal direction so that the laminating direction of the electromagnetic steel plates of the movable core 10 is coincident with a laminating direction of electromagnetic steel plates of a general stator core 41 (refer to FIG. 11). Thus heat generation in the movable core 10 due to eddy current losses is suppressed. And, the movable core 10 having heights which are different from one another is easily obtained by employing the laminating arrangement of the electromagnetic steel plates. On the contrary, a transformer employed in an ordinary A.C. arc welder has a laminating direction of electromagnetic steel plates of a stator core and a laminating direction of electromagnetic steel plates of a movable core, where the first direction is vertical to the latter direction (refer to FIG. 19), so that great iron losses called eddy current losses are generated in the movable core and the temperature of the transformer in its entirety is greatly raised.

FOURTH EMBODIMENT

Figure 13:
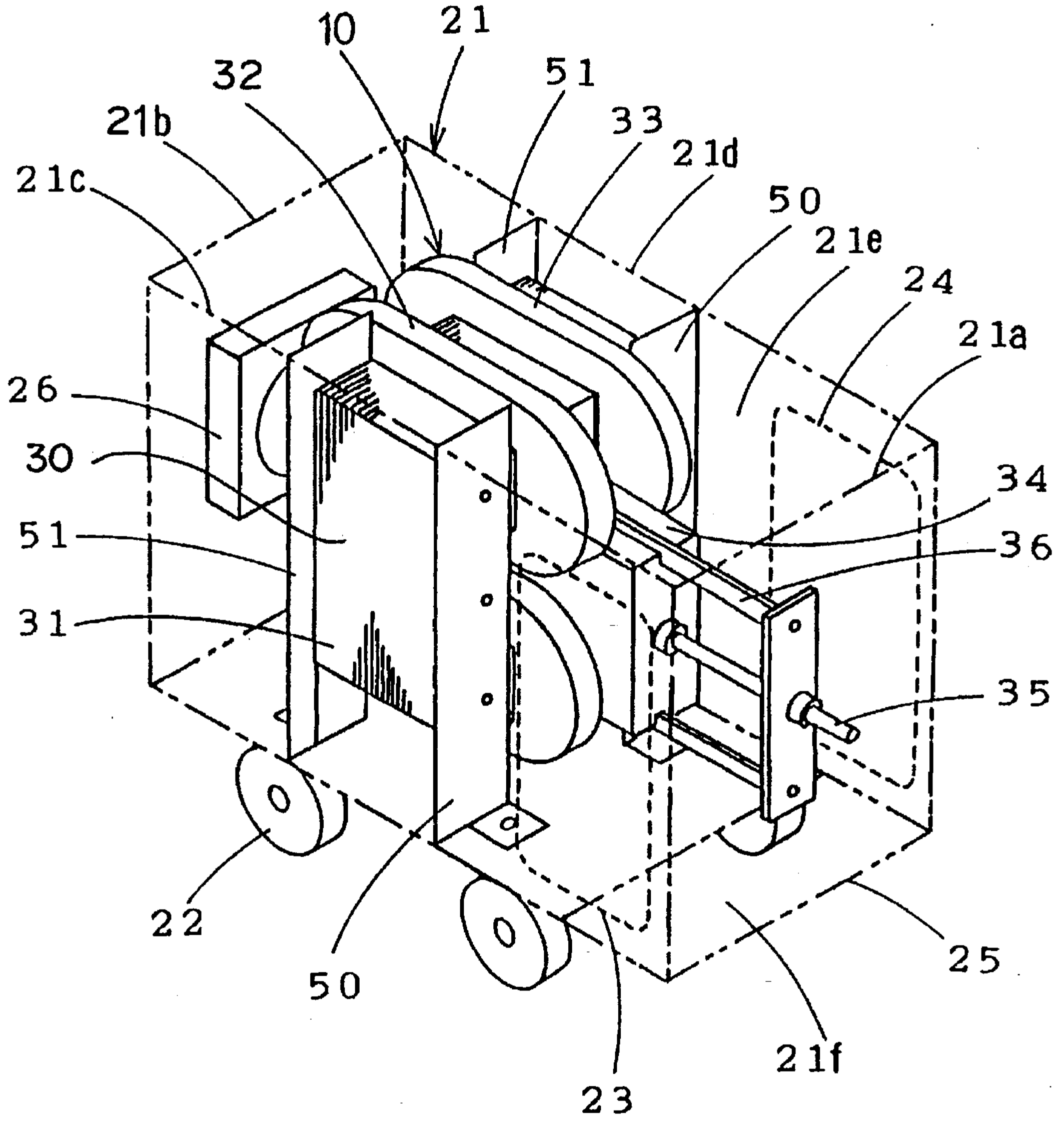
FIG. 13 is an outer perspective view illustrating an inner structure of another A.C. arc welder.

FIG. 13 illustrates an outer perspective view showing an inner arrangement of an A.C. arc welder according to the fourth embodiment of the present invention.

This A.C. arc welder includes a case cover 21 having a duct shape (refer to two dots and dash line) which has a front plate 21*a*, rear plate 21*b*, side plates 21*c*, 21*d*, top plate 21*e* and bottom plate 21*f*. The case cover 21 also includes wheels 22 which are provided to the bottom plate 21*f* so that the case cover 21 can move by the wheels 22. Openings 23, 24 and 25 for taking in air are formed at front side portions of the side plates 21*c*, 21*d* and the bottom plate 21*f* of the case cover 21, respectively. A fan 26 for exhausting air is provided to the rear plate 21*b*. Also, a transformer 30 is disposed within the case cover 21.

The transformer 30 includes a stator core 31 and primary coils 32 and secondary coils 33 which are wound to the stator core 31. The transformer includes a movable core 34 which is disposed in a gap between the primary coils 32 and secondary coils 33 in a movable manner. Gaps between the movable cope 34 and the primary coils 32 and secondary coils 33 are varied so as to adjust the output current from the secondary coils 33 by rotating a screw shaft 35 which is engaged with the movable core 34 so as to move the movable core 34 forward or backward along the Guide rail mechanisms 36.

The openings 23 and 24 for taking in air through both side plates 21*c* and 21*d* are positioned at a frontward position from the front edge face of the stator core 31 of the transformer 30 (refer to FIGS. 14 and 15), and the opening 25 for taking in air through the bottom plate 21*f* is positioned at a frontward position smilarly. Except for an opening formed in the rear plate 21*b* for the fan 26 for exhausting air (the opening has a finger guard structure for preventing the finger of a man from erroneously contacting the fan 26 while it is rotating) and the openings 23, 24 and 25 for taking in air, the case cover 21 has a sealed structure. Further, an opening for taking in air (not illustrated) may be formed partly in the front plate 21*a* of the case cover 21 so as to allow fresh outer air to flow in the case cover 21 having a longitudinally elongated duct shape from the front portion to the rear portion. A total area of openings for taking in air must be an area which enables taking in a quantity of air which is sufficient for the rated flow ($m^3$/min) of the fan 26 for exhausting air.

The transformer 30 according to the embodiment includes front air straightening plates 50 and rear air straightening plates 51 which are provided near the front edge face and rear edge face of the stator core 31, respectively. The front air straightening plates 50 and rear air straightening plates 51 let the air taken in from the openings 23, 24 and 25 flow toward the rear portion of the case cover 21 along the outer faces of the primary coils 32 and the secondary coils 33. Each of the front air straightening plates 50 and the rear air straightening plates 51 has a size so that an outer edge portion of each air plate is close to the top plate 21*e*, side plates 21*c*, 21*d* and the bottom plate 21*f* so that the taken in outer air is prevented from flowing in a gap between the stator core 31 and the corresponding side plate towards the rear portion of the case cover 21. In FIG. 13, the front air straightening plates 50 and the rear air straightening plates 51 are provided, but only the front air straightening plates 50 or only the rear air straightening plates 51 may be provided depending upon the shape and the size of the transformer housed in the case cover 21, as shown in FIG. 14 and FIG. 15, respectively.

Though the air straightening plates 50 and 51 are close to the stator core 31 and the case cover 21 (the case cover 21 is usually made of a steel plate), it is preferable that the air straightening plates are made of non-magnetic material such as aluminium plates so that vibration and noise of the case cover 21 caused by the influence of excess leakage flux and the like are prevented from occurring. However, the air straightening plates may be made of steel plates by taking the proper positions and the like into consideration.

Figure 14:
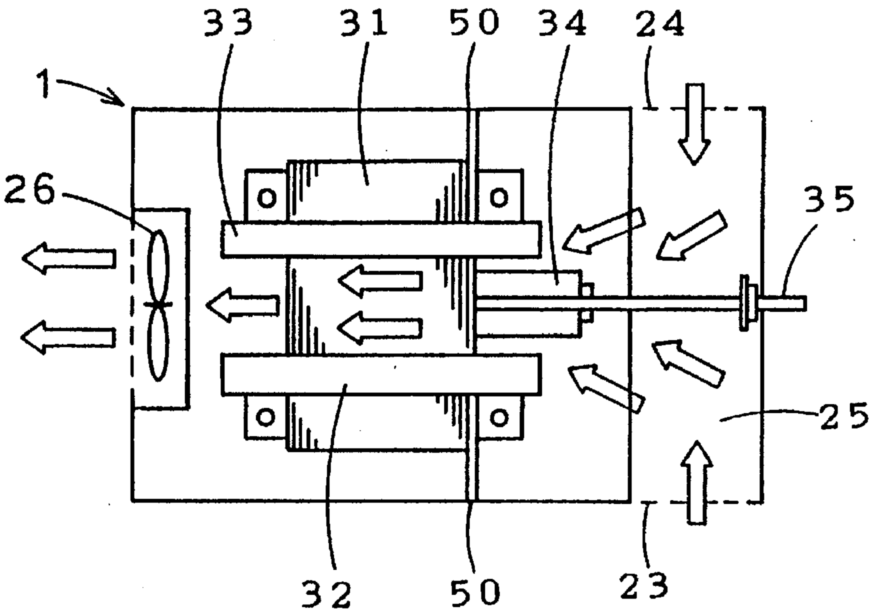
FIG. 14 is an upper face view illustrating air flows in the A.C. arc welder (which has air regulating plates in a front portion)
Figure 15:
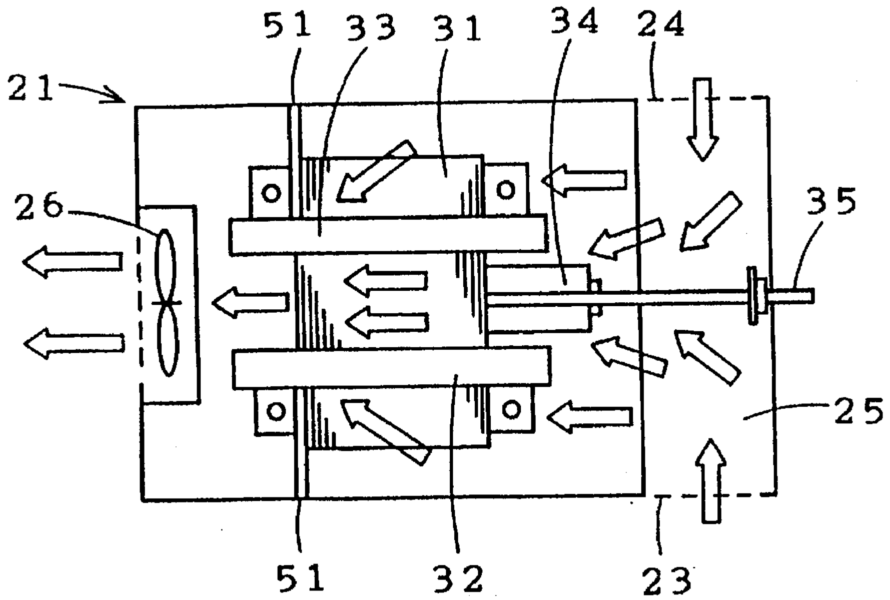
FIG. 15 is an upper face view illustrating air flows in the A.C. arc welder (which has air regulating plates in a rear portion)

The cooling air flow (refer to the arrows in the figures) in the A.C. arc welder is illustrated in FIG. 14. In FIG. 14, only the front air straightening plates 50 are disposed.

The outer air taken in through the openings 23, 24 and 25 for taking in air positioned in the front portion of the case cover 21 flows towards the rear portion of the case cover 21 by the rotation of the fan 26 for exhausting air. The flowing air scarcely flows in a gap between the stator core 31 and the case cover 21 blocked by the front air straightening plates 50. Thus, the flowing air mostly flows in gaps between the primary coils 32 and the secondary coils 33, that is, on the outer face of the primary coils 32 and the secondary coils 33 which have great generating quantities. Therefore, heat exchange between the fresh cool air and the outer faces of the primary coils 32 and the secondary coils 33 is performed effectively. The air warmed by the heat exchange is exhausted from the rear potrtion of the case cover 21 by the fan 26 for exhausting air.

The cooling air flow (refer to arrows) in another embodiment of the A.C. arc welder of the invention is illustrated in FIG. 15. In FIG. 15, only the rear air straightening plates 51 are disposed.

The outer air taken in through the openings 23, 24 and 25 for taking in air positioned in the front portion of the case cover 21 flows not only in gaps between the primary coils 32 and the secondary coils 33 but also in gaps between the stator core 31 and the case cover 21. But, the air flow flowing in the gaps between the stator core 31 and the case cover 21 scarcely directly reaches the fan 26 for exhausting air. Therefore, the air taken in from the openings 23, 24 and 25 mostly flows on the outer faces of the primary coils 32 and the secondary coils 33 similarly to FIG. 14.

Figure 16:
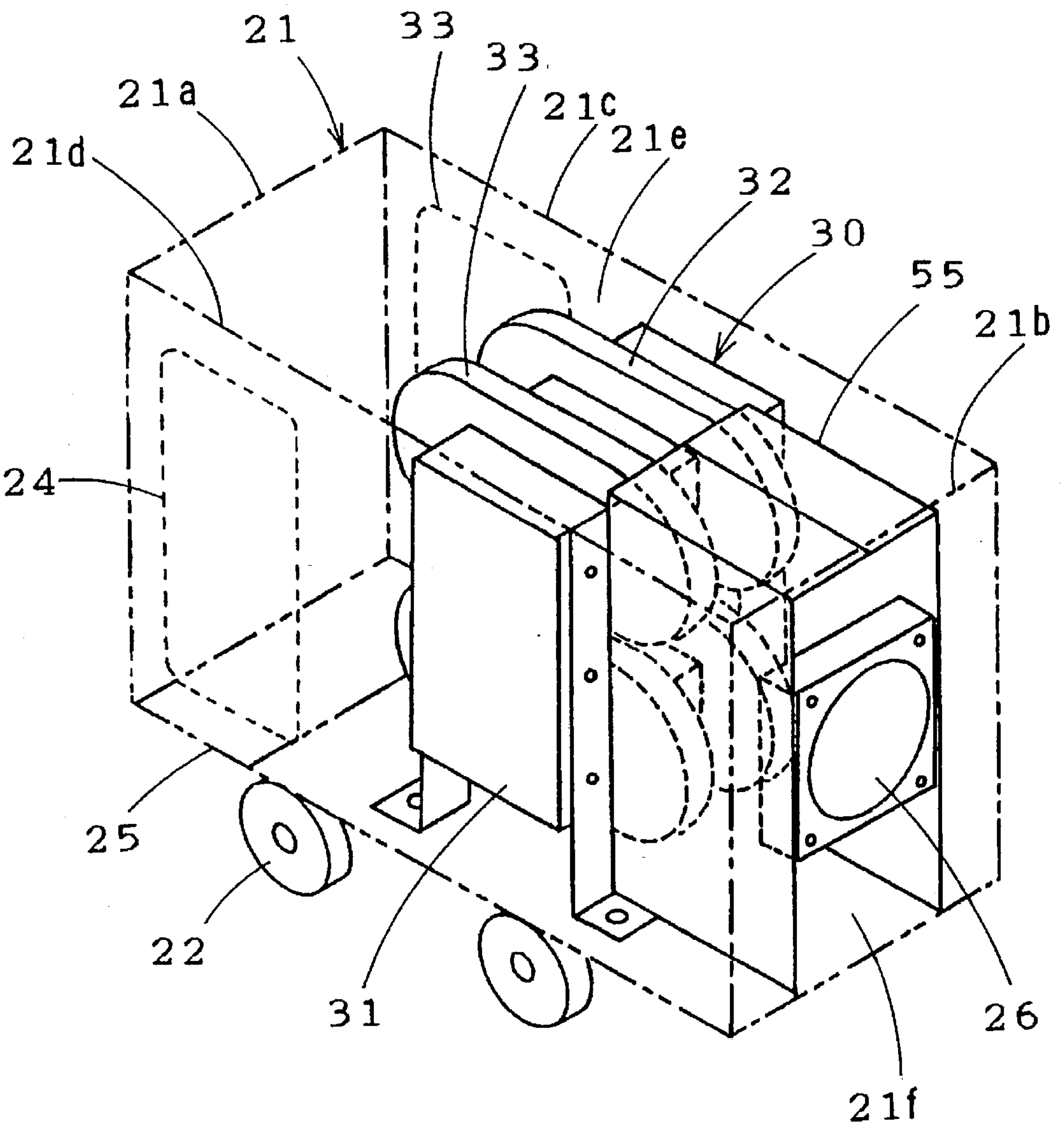
FIG. 16 is an outer perspective view illustrating an inner structure of a further A.C. arc welder.

FIG. 16 illustrates an example in which an exhausting duct is provided in the rear portion of the case cover 21. FIG. 16 is a view which sees the A.C. arc welder from its rear. The front air straightening plates 50 and the rear air straightening plates 51 are omitted for convenience. The case cover 21 has a sealed construction except for the opening formed for the fan 26 for exhausting air in the rear plate 21*b* of the case cover 21 and the openings 23, 24 and 25 for taking in air formed in the side plates 21*c* and 21*d* and the bottom plate 21*f*, respectively.

The exhausting duct 55 is positioned at a space which is formed between near the rear edge face of the stator core 31 of the transformer 30 and the rear plate 21*f* of the case cover 21. Though the exhausting duct 55 is close to the stator core 31 and the rear plate 21*f* of the case cover 21, it is preferable that the exhausting duct is made of non-magnetic material (for example, aluminium plates) so that vibration and noise of the case cover 21 caused by the influence of excess leakage flux and the like are prevented from occurring. However, the exhausting duct 55 may be made of steel plates by taking the proper positions and the like into consideration. Further, the top plate of the exhausting duct 55 may be omitted when the top plate of the exhausting duct 55 and the top plate 21*e* of the case cover 21 are adjacent to one another (refer to FIG. 18).

Figure 17:
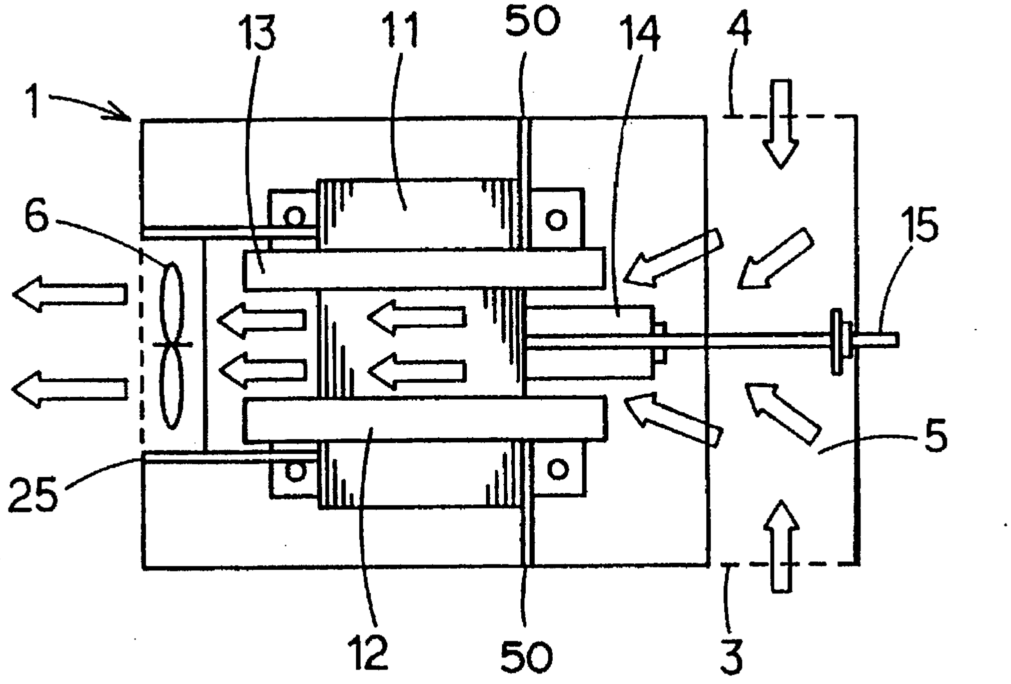
FIG. 17 is an upper face view illustrating air flows in the A.C. arc welder.
Figure 18:
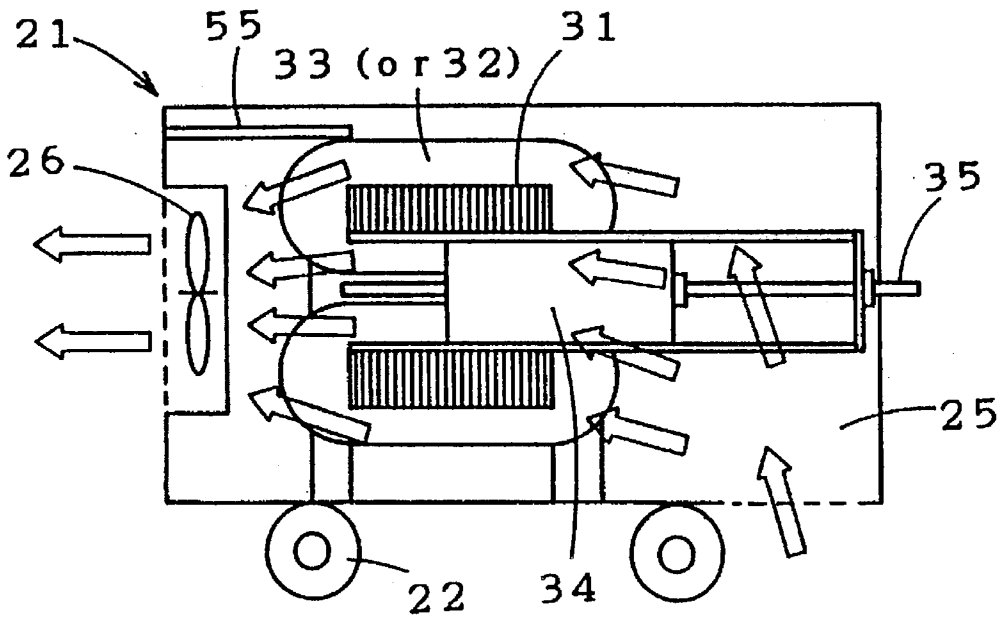
FIG. 18 is a left side view illustrating air flows in the A.C. arc welder.

The cooling air flow when the exhausting duct 55 is provided is illustrated by arrows in FIG. 17 (upper face view) and in FIG. 18 (left side view).

The outer air taken in through the openings 23, 24 and 25 for taking in air mostly flows on the outer faces of the primary coils 32 and the secondary coils 33 by the front air straightening plates 50 similarly to FIG. 14. And, only air flow which is used for heat radiating and cooling of the primary coils 32 and the secondary coils 33 is guided to the fan 26 for exhausting air through the exhausting duct 55 so as to improve the exhausting effect.

The transformer may employ heat radiating plates which extend outerward from the interlayers of the coil. The heat radiating plates may be fillet welded to corresponding layer of the coil. When one of these arrangements is employed, the cooling ability of the transformer is improved because the heat radiating effect of the transformer is improved. Therefore, the A.C. arc welder can be decreased in size and in weight.

What is claimed is:

1. A transformer comprising;
   - a core;
   - at least one coil wound around the core; and
   - a heat radiating plate provided between layers of the coil, and which projects outside of the coil, the heat radiating plate including
     - a first portion projecting outside of the coil, which is flat and which extends in a direction vertical to a winding direction of the coil, and
     - a second portion projecting outside of the coil and having a plurality of grooves which extend away from the first portion, each of the grooves having a depth which increases along a direction away from the first portion.

2. A transformer as set forth in claim 1, wherein the heat radiating plate is provided intermediately between a winding starting layer of the coil and a winding ending layer of the coil.

3. A transformer as set forth in claim 1, wherein the heat radiating plate further includes a third portion which projects outside of the coil and which is fillet welded to the coil.

4. A transformer as set forth in claim 3, wherein the coil and the heat radiating plate are made of copper or aluminium, and the fillet welding is made by tungsten inert gas welding.

5. A transformer comprising:
   - a stator core,
   - primary coils and secondary coils wound around the stator core in an opposing condition, and
   - a movable core movably disposed between one of the primary coils, one of the secondary coils, another of the primary coils, and another of the secondary coils, the movable core
     - being movable in a movable direction,
     - having different widths along the movable direction such that a narrower portion of the movable core is longer in the movable direction than a wider portion of the movable core, and
     - being formed of more than two portions of different widths, each of the portions being made by laminating electromagnetic steel plates such that a width of a first electromagnetic steel plate at one of the portions is different from a width of a second electromagnetic steel plate at another of the portions, the electromagnetic steel plates being laminated in a direction crossing the primary coils and the secondary coils.

6. A transformer comprising:
   - a stator core,
   - primary coils and secondary coils wound around the stator core in an opposing condition, and
   - a movable core movably disposed between one of the primary coils, one of the secondary coils, another of the primary coils, and another of the secondary coils, the movable core
     - being movable in a movable direction,
     - having different widths along the movable direction such that a narrower portion of the movable core is longer in the movable direction than a wider portion of the movable core, and
     - being formed of more than two portions of different widths, each of the portions being made by laminating electromagnetic steel plates such that
       - a width of a first electromagnetic steel plate at one of the portions is different from a width of a second electromagnetic steel plate at another of the portions, and the one of the portions is made of electromagnetic steel plates having first magnetic characteristics and the another of the portions is made of electromagnetic steel plates having second magnetic characteristics which are different from the first magnetic characteristics.

7. A transformer as set forth in claim 6, wherein the electromagnetic steel plates are laminated in the movable direction.

8. A transformer as set forth in claim 6, wherein the electromagnetic steel plates are laminated in a direction crossing the primary coils and the secondary coils.

9. An A.C. arc welder comprising:

a case cover having a top plate, a front plate, a rear plate, two side plates and a bottom plate, a front side portion of each of the two side plates and the bottom plate each defining an opening for taking in air from outside of the case cover;

a transformer disposed within the case cover, the transformer including a core section and coils;

a fan for exhausting air provided at the rear plate of the case cover;

air straightening plates interposed between the core section and the side plates for directing a flow of air taken in through the openings towards a rear portion of the case cover along outer faces of the coils; and an exhausting duct disposed between a rear edge face of the core section and the rear plate, for directing the flow of air towards the fan.

10. An A.C. arc welder as set forth in claim 9, wherein the air straightening plates are front air straightening plates located near or at a front edge face of the core section.

11. An A.C. arc welder as set forth in claim 9, wherein the air straightening plates are rear air straightening plates located near or at a rear edge face of the core section.

12. An A.C. arc welder as set forth in claim 11, further including front air straightening plates located near or at a front edge face of the core section for directing the flow of outer air taken in through the openings towards the rear portion of the case cover along the outer faces of the coils.

13. An A.C. arc welder as set forth in claim 9, further including a mesh guard member for preventing particles from being taken into the case cover, the mesh guard being provided at the opening for taking in outer air defined by the bottom plate of the case cover.

14. An A.C. arc welder as set forth in claim 9, wherein a top plate of the exhausting duct unites the top plate of the case cover.

15. An A.C. arc welder as set forth in in claim 9, wherein the transformer includes a coil and a heat radiating plate which projects outward from between interior layers of the coil.

16. An A.C. arc welder as set forth in claim 9, wherein the transformer includes a coil and a heat radiating plate which projects inward and outward from between interior layers of the coil, and an inward projecting portion or an outward projecting portion of the heat radiating plate is fillet welded to the coil.

17. A transformer comprising:

a stator core, primary coils and secondary coils wound around the stator core in an opposing condition, and a movable core movably disposed between one of the primary coils, one of the secondary coils, another of the primary coils, and another of the secondary coils, the movable core being movable in a movable direction, having different widths along the movable direction such that a narrower portion of the movable core is longer in the movable direction than a wider portion of the movable core, and being formed of more than two portions of different widths, each of the portions being made by laminating electromagnetic steel plates such that a width of a first electromagnetic steel plate at one of the portions is different from a width of a second electromagnetic steel plate at another of the portions, the electromagnetic steel plates being laminated in the movable direction.

* * * * *